United States Patent [19]
Kammiller

[11] Patent Number: 5,930,123
[45] Date of Patent: Jul. 27, 1999

[54] RESET CIRCUIT FOR CURRENT TRANSFORMER HAVING A SHORT RESET INTERVAL

[75] Inventor: Neil A. Kammiller, Lorain, Ohio

[73] Assignee: Reltec Corporation, Lorain, Ohio

[21] Appl. No.: 08/696,505

[22] Filed: Aug. 14, 1996

[51] Int. Cl.$^6$ .............................................. H02M 3/335
[52] U.S. Cl. ........................................................ 363/20
[58] Field of Search .............................. 363/16, 18–21, 363/97, 131; 336/182, 183

[56] References Cited

U.S. PATENT DOCUMENTS

| | | | |
|---|---|---|---|
| Re. 32,155 | 5/1986 | Nilssen | 363/18 |
| 4,399,500 | 8/1983 | Clarke et al. . | |
| 4,410,810 | 10/1983 | Christen . | |
| 4,441,146 | 4/1984 | Vinciarelli . | |
| 4,516,183 | 5/1985 | Matsuzaki et al. . | |
| 4,611,267 | 9/1986 | McMurray . | |
| 4,626,976 | 12/1986 | Abe et al. | 363/19 |
| 4,760,512 | 7/1988 | Loftus . | |
| 4,775,803 | 10/1988 | Mori . | |
| 4,785,387 | 11/1988 | Lee et al. | 363/21 |
| 4,811,187 | 3/1989 | Nakajima et al. . | |
| 4,870,554 | 9/1989 | Smith | 363/20 |
| 5,309,344 | 5/1994 | Smith . | |
| 5,331,533 | 7/1994 | Smith . | |
| 5,392,206 | 2/1995 | Peterson et al. . | |
| 5,414,342 | 5/1995 | Mammano et al. . | |
| 5,418,703 | 5/1995 | Hitchcock et al. . | |
| 5,471,376 | 11/1995 | Tsai et al. | 363/20 |
| 5,559,682 | 9/1996 | Kanouda et al. | 363/21 |
| 5,610,508 | 3/1997 | Kammiller | 323/358 |

*Primary Examiner*—Matthew V. Nguyen
*Attorney, Agent, or Firm*—Fay, Sharpe, Beall, Fagan, Minnich & McKee

[57] ABSTRACT

A current transformer reset circuit, which uses two separately controlled operational parts to reset a current transformer. The first operational part is a current source used to generate a reset current. The second operational part is a reset switch, which when turned on allows reset current to flow through the current transformer in a manner which acts to reset the flux magnetization of the current transformer.

16 Claims, 3 Drawing Sheets t=microseconds

RESET CIRCUIT FOR CURRENT TRANSFORMER HAVING A SHORT RESET INTERVAL

BACKGROUND OF THE INVENTION

The invention pertains to the art of current transformers and more particularly to a circuit providing a forced reset of a current transformer within a short time interval.

The invention is applicable to switching circuits, including power supplies, including resonant transition switching and, where core saturation of a current transformer can occur. It will be appreciated, however, that the invention has broader applications and can be advantageously employed in other environments and applications.

Resonant transition switching circuits are well known in the art. Such circuits are also known to include power factor correction circuitry which achieves boost regulation. A typical circuit of this type consists of an input in series with an inductor and a switch to connect one end of the inductor to circuit common. This arrangement provides an input rectified line through an inductor. When a switch of the switching circuit turns on, current builds within the inductor thereby storing energy in the inductor. When the switch turns off energy stored in the inductor, particularly $I^2L$ energy, flows through a path including, for example, a free wheeling diode used to charge a bank capacitor.

In resonant transition switching circuits, such a boost regulator circuit employs resonant components including a resonant inductor and a resonant switch. The resonant components cooperate to minimize losses during switching time periods by storing energy that would have normally been lost in discharging a drain capacitance of a FET type switch, and storing this energy within the resonant inductor.

Resonant transition switching circuits are known to commonly include current transformers. However, a problem which exists and to which the subject application is directed, is that magnetic saturation of the current transformers can occur in switching circuits of this type since current in the current transformer can potentially flow for substantially one-hundred percent (100%) of a duty cycle. This situation exists since a duty cycle involves initially switching on a resonant switch and thereafter turning on a main switch. This type of arrangement causes a rise of current in the current transformer, starting at an initial time zero. Current initially builds in the current transformer due to current flow within the resonant circuitry and then due to the current flowing in the main circuit after the main switch has been turned on. Under these conditions, current builds in the resonant switch and then flattens out and decays, however, prior to a full decay of the current in the resonant switch the main switch begins building current and carries current until the end of the duty cycle. The duty cycle will approach 100%. Therefore, when investigating the state of a switching circuit, current will be seen as building in the main switch as current is falling in the resonant switch. However, the current transformer will see the sum of these currents. Due to this topology the current transformer will sense current for almost the entire duty cycle. When this situation occurs, the current transformer has a short time to reset.

In circuits which allow sufficient time between switching duty cycles, the current transformer will perform a natural reset. The reset is accomplished with $I^2L$ energy stored in the current transformer shunt inductance during the "set" interval. However, in high frequency resonant transition switching circuits of the type contemplated for use with the subject invention, the energy stored for reset causes high "set" currents.

In order to maintain correct current transformer operation and to avoid high "set" currents which may cause distortion and current transformer saturation, it is necessary to provide for some sort of external current transformer reset. In view of this, to perform a reset it is necessary to provide the current transformer with a relatively large reset current pulse in a very short time period. For instance, if a switching circuit is used which has a power pulse time period or duty cycle of five (5) microseconds, the current transformer can be on for substantially this entire time period, and there may be only tens of nanoseconds in which to provide a reset pulse for the current transformer before a next power pulse will start. If the current transformer is not externally reset within the small window of time between power pulses, the reset energy required to be stored can take the current transformer into forward saturation.

However, while it is desired to reset a current transformer with a reset power pulse that is sufficient to move the current transformer from potential saturation to a lower flux level it is not desirable to provide an energy pulse, which resets the current transformer, but which also takes it into reverse saturation thereby undesirably storing energy which can be released as part of the set interval. This could be a detriment to overall circuit operation. Therefore, it is considered that if the energy pulse is either too large or applied for too long a period, unstable operation of the circuit can result.

It has, therefore, been deemed desirable to construct a circuit which provides a sufficient reset power pulse in a short time period that resets the current transformer to a desired flux level, but which does not drive the magnetization curve into reverse saturation.

Still further, the circuit should be easily constructed within existing switching circuit designs wherein its application resets the current transformer without affecting the main power pulses.

SUMMARY OF THE INVENTION

The present invention contemplates a new and improved current transformer reset circuit that overcomes all of the above-noted problems and others, which is easily implemented into existing switching circuit designs and provides a sufficient reset power pulse in the available time period.

According to a more limited aspect of the invention, the reset circuit provides two function points or parts wherein a first part acts to provide a predetermined reset power pulse and a second part determines the duration of the reset power pulse.

According to yet another aspect of the invention, the first function part is a current source and the second function part is a reset switch implemented with a FET.

A principal advantage of the invention is provision of a current transformer reset circuit that generates a reset pulse in an available time period, for a high frequency switching circuit.

Still another advantage of the present invention is that it is realizable within existing circuit designs.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
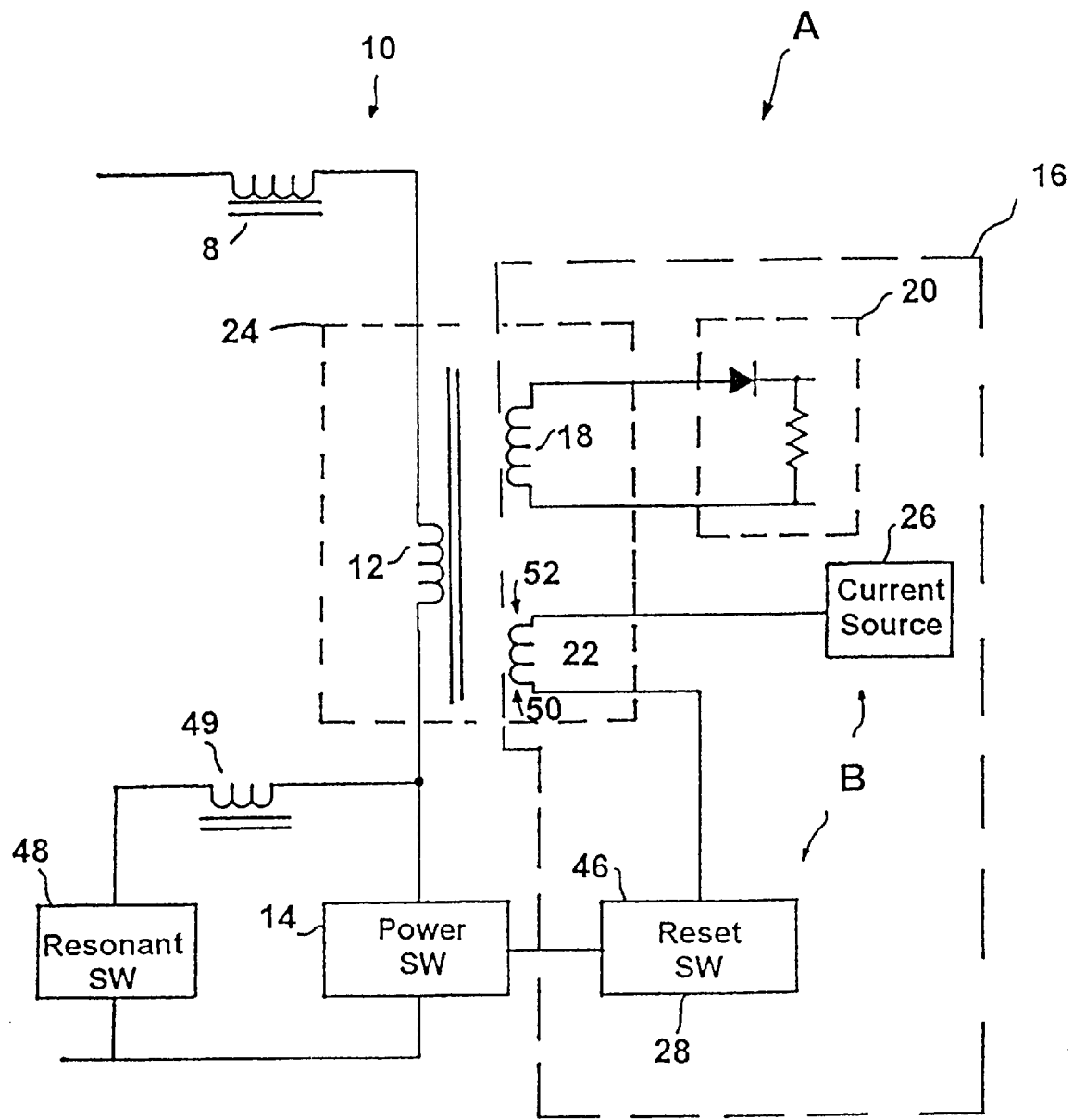
FIG. 1 illustrates a block diagram of the circuit incorporating the current transformer reset circuit according to the subject invention.

Reference is now made to the drawings wherein the showings are for the purposes of illustrating the preferred embodiment of the invention, directed toward power factor correction, and not for purposes of limiting same. FIG. 1 provides relevant portions of a resonant transition switching circuit A including a power switch 14, an inductor 8 and a current transformer 24. The current transformer having a primary winding 12. The current transformer secondary circuit 16 including main secondary winding 18 inductively coupled to the primary side 10 of current transformer 24. The main secondary winding 18 generates a signal for use by main circuit 20. In addition to this arrangement an auxiliary winding 22 of current transformer 24 is inductively coupled to primary side 10. Connected to current transformer 24 is a two part reset circuit B which operates to control resetting of current transformer 24.

Figure 2:
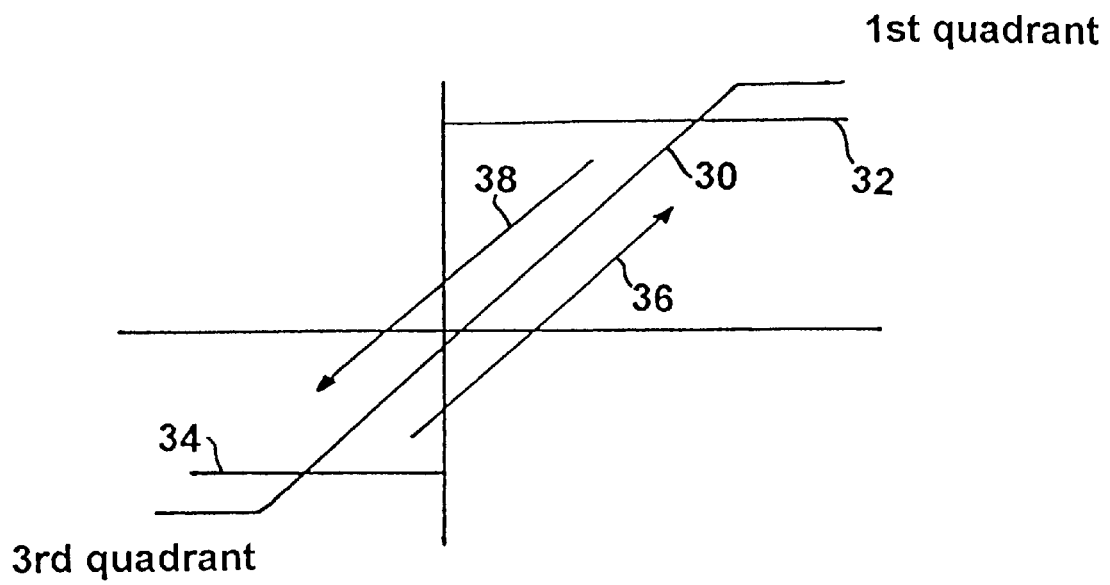
FIG. 2 sets forth a magnetization curve for the current transformer according to the subject invention.

FIG. 2 illustrates a magnetization curve 30 for current transformer 24, with a positive saturation level 32 and a negative saturation level 34. When current transformer 24 enters into either of these saturation levels, operation of the current transformer causes unstable distorted operation of the overall circuit A of FIG. 1. It is, therefore, desirable to maintain current transformer 24 within a range between positive saturation 32 and negative saturation 34. During the set time of current transformer 24, which is where a positive power pulse is applied in switching circuit A, the magnetization of current transformer 24 moves in a positive direction towards or into the first quadrant, generally along path 36. During resetting of current transformer 24 the magnetization of current transformer 24 will move in a negative direction and will generally follow path 38 towards or into the third quadrant.

Figure 3:
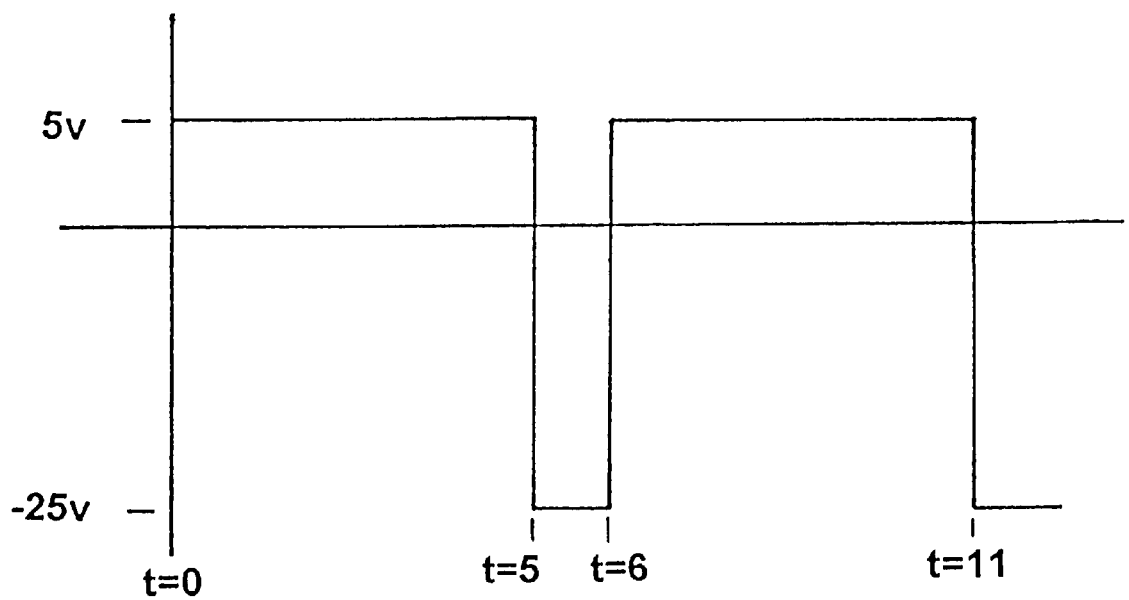
FIG. 3 illustrates power pulses and a reset power pulse for the circuit of FIG. 1; and, FIG. 4 provides a more detailed illustration of the current transformer reset circuit according to the subject invention.

Turning attention to FIG. 3, during operation of switching circuit A, first (positive) power pulse 40 is applied, which for discussion purposes produces a value of five (5) volts across secondary 18 of current transformer 24, and is applied for five (5) microseconds. It is to be appreciated, however, that power pulses of other magnitudes and durations which are useable within a particular switching circuit may be experienced. For this discussion, it is further assumed that in addition to the first power pulse 40, starting at time equal to zero, a second (positive) identical power pulse 42 producing (5) volts for five (5) microseconds is activated at six (6) microseconds. During application of first power pulse 40, the magnetization of current transformer 24 follows magnetization curve 30 generally designated by path 36, as illustrated in FIG. 2. If a reset of current transformer 24 does not take place during the time period between the end of first power pulse 40 and the start of second power pulse 42, current transformer 24 receives additional setting current moving the magnetization toward positive saturation level 32. A self-resetting current transformer takes its required reset energy from its own magnetization current. It is to be appreciated that while the time between power pulses is assumed to be one microsecond this is chosen for ease of discussion and in actual practice only nanoseconds may be available to reset a current transformer in known resonant transition switching circuits.

With further attention to FIG. 3, in order to reset current transformer 24 it is necessary to apply a reset pulse 44 which will reset current transformer 24 such that when the second power pulse 42 is applied, current transformer 24 can be maintained out of positive saturation level 32. Continuing with this example, in order to reset current transformer 24 it is necessary to provide a reset pulse 44 of volt-microseconds in a reverse direction equal to twenty-five (25) volt-microseconds. This is equal to the positive power pulse in the set direction of five (5) volts for five (5) microseconds. The reset power pulse should be a fast rising pulse of high voltage and controlled current applied during a short time period. Therefore, a reset circuit is desired which has an initial low impedance that then becomes a current limited source to ensure that the amount of volt-microseconds supplied by the reset pulse 44 does not push the magnetization curve of current transformer 24 into negative saturation 34.

With more particular attention to FIG. 1, current transformer 24 is connected with a two part reset circuit B which includes current source 26 and reset switch 28. Reset switch 28 is connected to power switch 14 through line 46 in an arrangement whereby, when power switch 14 is on, reset switch 28 is off and when power switch 14 is off, reset switch 28 is on. Also illustrated in FIG. 1 are resonant components, including resonant switch 48, and resonant inductor 49 associated with power switch 14. As discussed in the Background of the Invention, during switching operation resonant switch 48 will turn on prior to power switch 14 such that during operation of switching circuit A, current transformer 24 sees a positive set voltage for substantially a one hundred percent (100%) duty cycle, such as first power pulse 40. The two part reset circuit 26, 28 of the present invention operates to address the shortcomings that exist in a self resetting current transformer previously described.

Specifically, while power switch 14 is active and first power pulse 40 is supplying a positive voltage to current transformer 24, current is flowing in a positive direction 50 through current transformer 24. After five (5) microseconds, power switch 14 is placed to an off state, removing power pulse 40. At this point a negative flowing current 52 needs to be supplied to current transformer 24 in order to quickly reset the flux level, as illustrated in the magnetization curve of FIG. 2.

To accomplish the above, current source 26 operates to generate current used in the resetting of current transformer 24. At the same time, power switch 14 enters an off state, causing switch 28 to be turned on, providing a path for current to flow through current transformer 24 in a negative direction 52. The internal voltage source of current source 26 provides sufficient volt-microseconds to current transformer 24 to reset current transformer 24 in a negative flux direction without forcing negative saturation. Thereafter, when second power pulse 42 is started by power switch 14 reset switch 28 will turn off, removing the current path for current source 26.

Thus, two part control is provided to reset current transformer 24, wherein current source 26 controls the amount of current generated and reset switch 28 controls the on and off times of the reset operation.

Figure 4:
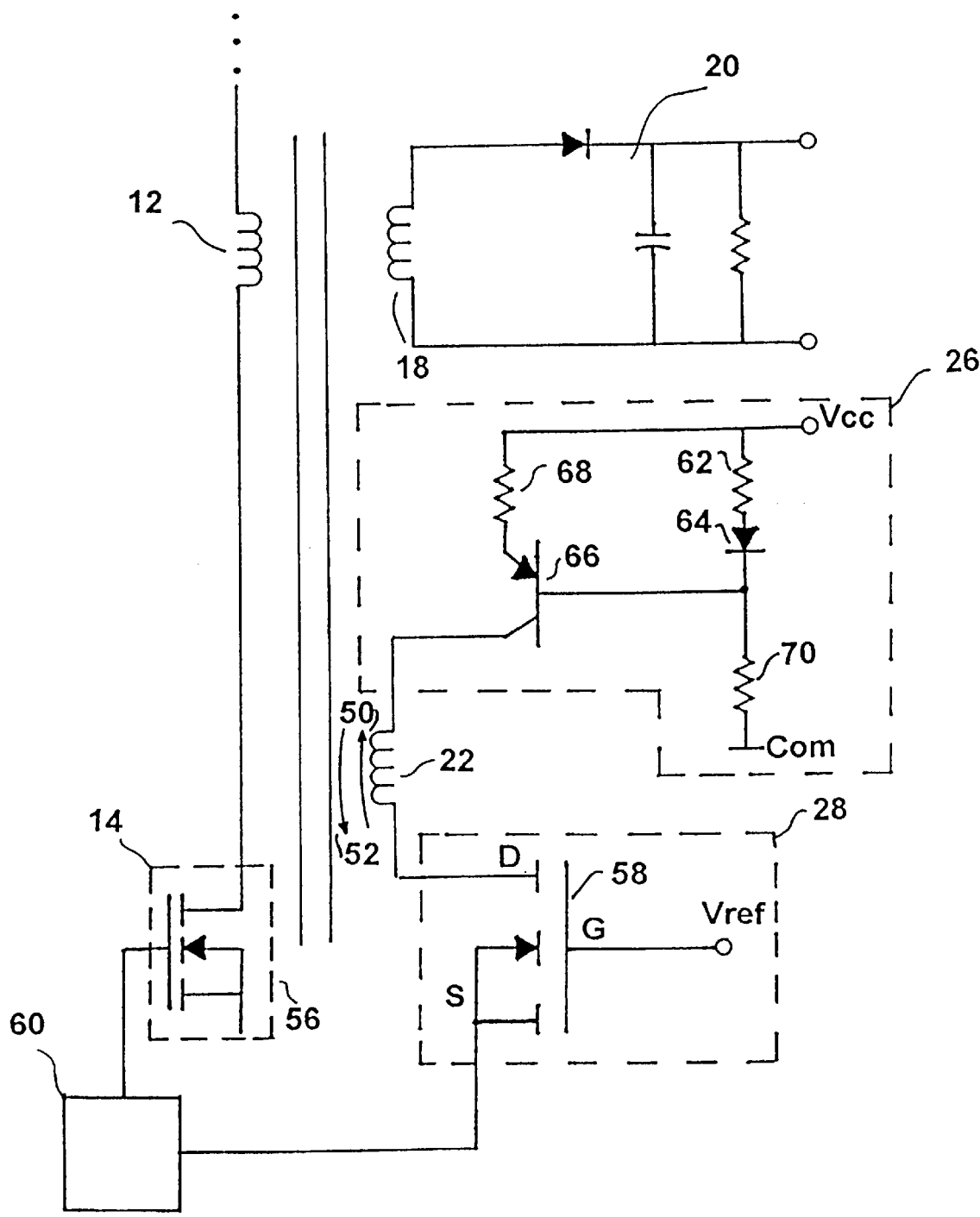

For a more detailed description of the construction concerning the two part forced reset circuit 26, 28, attention is directed to FIG. 4. Elements in FIG. 4 which are the same as those in FIG. 1 are numbered similarly with greater detail being provided in some instances.

Main power switch 14 employs as its switching device, FET 56 which receives a drive signal from signal generator 60 at its gate. Reset switch 28 employs a source driven FET 58 as its switching element, configured with $V_{ref}$ supplied to its gate, and its source being driven with the same drive signal that drives the gate of FET 56. By this arrangement, when the drive signal used to drive the main power switch 14 is zero, thereby turning off FET 56, FET 58 is turned on since the source of FET 58 is at zero. Other configurations to provide the gate signal of switching FET 56 to reset FET 58 are possible, including connecting the gates of the FET switches thru a control chip (not shown in the FIGURE).

Current source 26, may also be thought of as a current limiter or regulator. Current source 26 includes a reference for the current limiting action which is formed by resistor 62, diode 64, resistor 70 and the voltage of VCC. A current is sensed in resistor 68 and compared in transistor 66 base emitter. By selecting appropriate values of these elements a desired current limiting set-point is developed. It is to be appreciated that other elements and/or configurations can be used to provide a current source having current limiting capabilities.

When main power switch 14 is on, reset FET 58 of reset switch 28 is in an off state. At this point, there is no voltage or current being generated within current source 26. During this time period, the current in the drain of FET 58 is zero and there is no resetting action taking place. However, as soon as reset FET 58 is turned on, winding 22 sees a large amount of voltage, which is substantially equal to the voltage Vcc. Essentially no voltage is being dropped within current source 26. This operation provides an initial "slam" condition moving the voltage from zero volts to a maximum, thereby beginning the generation of negative current 52, through current transformer 24, greater than a set-point of the current limiting feature of current source 26. Current source 26 senses the current values and operates to limit the current being generated to bring the negative current within acceptable levels.

Current source 26 is by its nature a current limiter, therefore, when current is passed through resistor 68, transistor 66 generates a voltage which is compared against the reference combination of resistor 62 and diode 64, wherein current limiting reference values are determined from Vcc down to the cathode of diode 64.

The two point forced reset control 26, 28 for current transformer 24 initially acts to force voltage onto current transformer 24 until the bi-polar transistor 66 generates a voltage instituting a current limiting situation. During the initial stages of resetting the current transformer, there may not be any current in current transformer 24, as the current has not had time to build up. It may even be possible that current transformer 24 is supplying energy left over from the set or positive power pulse time period. Whatever the case, during the initial reset time period, there will be full voltage on current transformer 24, then the negative current will be generated in winding 22 moving the magnetization from the positive saturation level 32.

Thus, the subject invention splits control of resetting the current transformer into two separately controlled parts, using a separate current source, with current limiting features and a hard switch, i.e. a switch such as a FET which turns on quickly with substantially zero impedance.

An aspect of the subject invention is the provision of a large voltage at the beginning of the reset pulse that allows the resetting the current transformer in a very short time period, i.e., in the range of nanoseconds. It is to be noted that it is also possible in the subject invention to delay the current limiting action so that application of the voltage to the current transformer is provided for a longer time period.

In the present invention, current transformer 24 can be reset any time that the main power switch 14 does not have a gate drive. Thus the only time that current transformer 24 will have reset current is during the off time of the switch 14, which is also the only time the reset current can be used, since reset current will not be used when the current transformer 24 is in a set mode, i.e. positive power pulse. When in the set mode the circuit has forward flowing current and information is being conveyed out of the main secondary 18 so it is not desirable to reset the circuit at this point.

When there is no gate drive for the main switch 14, the resonant switch 48 shown in FIG. 1 may still be on. However, at some point during resetting the resonant switch 48 will be turned off so that both switches 14, 48 are in an off state. In circuits tested by the inventors, current transformer 24 was able to be reset during the time period when both switches were in an off state.

The present forced two point reset B takes advantage of the initial state of the current limiting function of current source 26 so that when the reset switch 28, which is a fast low impedance switch such as FET 58, is turned on it will react with a very fast hard switching action. The source is driven and the switch is turned on at substantially zero volts and zero time. Since there is no current in the winding of current transformer 24, the current limiting elements of current source 26 will have the zero volts on them. This allows reset FET 58 to immediately fully turn on in a rapid fashion. Due to this, the first thing winding 22 sees during the reset period is Vcc and is thereby presented with maximum voltage in a substantially instantaneous manner. The voltage value Vcc will stay on winding 22 until the current limit is reached, then the current limiting portion of current source 26 operates to hold the current at a predetermined current limiting value. The current limiter will have no voltage drop until the current limiting portion (value) or set point is reached.

The forced two part reset 26, 28 is a state variable circuit which is only active under preset conditions so it does not interfere with normal forward operation of current transformer 24, and does not waste power since it is not delivering current during positive power pulses 40, 42 when it is not possible to reset the current transformer.

Thus, using forced two point reset 26, 28 of the present invention, it is possible to provide a high volt/second reset during the reset power pulse and to thereafter limit current provided to the resetting power pulse such that the magnetization of the current transformer is not placed into negative saturation.

In the subject invention, the inventor has implemented a circuit where the turns ratio of the current transformer 24 is twenty (20) turns and the main secondary 18 is forty (40) turns. The twenty (20) turns to forty (40) turns ratio was selected to allow sufficient resetting in consideration of the available resetting time. It is, however, to be appreciated that different turns and ratios may be used dependant on the characteristics of the switching circuit.

Resonant switching circuit A in which the two part forced reset circuit 26, 28 is implemented, uses the current transformer 24 instead of a current sensing resistor for shaping of waveforms. Therefore, by properly resetting the current transformer, consistent operation of the resonant switching circuit is accomplished. It is to be appreciated that although the present embodiment employs switches using FETs other devices which provide acceptable operating characteristics are useable. In a similar manner, the specific arrangement employed for the current source may be altered into other forms, such as a current mirror, and still would be useful in the present invention.

It is undesirable to place the current transformer into reverse saturation, since the stored energy during the reverse saturation time period may cause an inconsistency in operation thereby indicating a false forward signal during the positive pulse. While two part reset circuit B provides the resetting of current transformer 24 in a very short time period, it also allows for a sustained current for nearly a full duty cycle. The current generated has to be large enough to reset the current transformer in as little as five percent (5%) or less of the duty cycle but low enough so that it can withstand reverse current for ninety-five percent (95%) of the time in the positive direction.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

I claim:

1. A current transformer reset circuit comprising:
    a first operational part which generates a reset current for the current transformer; and
    a second operational part which provides a current path for the reset current, wherein the reset circuit is configured to reset the current transformer in 5% or less of a duty cycle without forcing the current transformer into reverse saturation.

2. The current transformer reset circuit according to claim 1 wherein the first and second operational parts are configured to be separately controlled.

3. The current transformer reset circuit according to claim 1 wherein the first operational part is a current limiting current source which supplies a regulated current, and the second operational part is a reset switch.

4. The current transformer reset circuit according to claim 3 wherein the reset switch is a reset FET, having a drain connected to the current transformer, a gate supplied with a reference voltage and a source connected to a drive signal.

5. The current transformer reset circuit according to claim 4 wherein the drive signal supplied to the source is substantially simultaneously applied to a power switch FET of the current transformer.

6. The current transformer reset circuit according to claim 5 wherein the first and second operational parts are configured to be separately controlled.

7. A method of resetting a current transformer comprising the steps of:
    supplying a drive signal to a gate of a power switch FET used as a power switch of a switching circuit including the current transformer;
    supplying the same drive signal supplied to the gate of the power switch FET to a source of a reset FET used as a reset switch;
    providing a reference signal to a gate of the reset FET;
    removing the drive signal from the gate of the power switch FET, whereby the drive signal supplied to the source of the reset FET is removed and the reset FET is thereby placed into an on state, thereby turning the reset switch in operative connection with the current transformer, to an on state;
    generating a reset current by a current source;
    supplying the reset current from the current source, through the current transformer for a time period substantially equal to the time the reset switch is on; and
    turning the reset switch to an off state.

8. The method of resetting a current transformer according to claim 7 wherein upon turning on the reset FET, Vcc is applied across the current transformer.

9. A reset circuit of a current transformer having a primary side winding, a primary side power switch connected to the primary side winding, and a main secondary winding electrically coupled to the primary side winding, the reset circuit comprising:
    an auxiliary secondary winding inductively coupled to the primary winding;
    a current source connected to the auxiliary secondary winding; and
    a current transformer reset switch connected to the auxiliary secondary winding, and configured to be placed in an active state of operation opposite an active state of operation of the primary side power switch.

10. The reset circuit according to claim 9 wherein the current source develops a regulated reset current, developed separate from current generated within the current transformer windings due to transformer action, the reset circuit configured to provide the regulated reset current for resetting of the current transformer.

11. The reset circuit according to claim 9 wherein the current transformer reset switch and the primary side power switch are configured to function using the same drive signal.

12. The reset circuit according to claim 9, wherein the reset circuit is configured to reset the current transformer in 5% or less of a duty cycle without forcing the current transformer into reverse saturation.

13. A method of resetting a current transformer comprising the steps of:
    supplying a same drive signal to a power switch of the current transformer and to a reset switch in operative connection with the current transformer, wherein the power switch and reset switch are driven to opposite states upon receipt of the same drive signal at substantially the same time;
    turning the reset switch to an on state due to the received drive signal;
    generating a regulated reset current by a current source;
    supplying the regulated reset current from the current source, through the current transformer for a time period substantially equal to the time the reset switch is on; and
    turning the reset switch to an off state.

14. The method of resetting a current transformer according to claim 13 wherein upon turning on the reset switch, Vcc is applied across the current transformer.

15. The method of resetting a current transformer according to claim 13 wherein the resetting of the current transformer takes place in 5% or less of a duty cycle and without forcing the current transformer into reverse saturation.

16. The method of resetting a current transformer according to claim 7 wherein the resetting of the current transformer takes place in 5% or less of a duty cycle and without forcing the current transformer into reverse saturation.

* * * * *